F. LIOUD.
APPARATUS FOR THE SEPARATION OF COKE OR CARBON FROM SLAG OR THE LIKE.
APPLICATION FILED JUNE 30, 1920.
1,438,537.
Patented Dec. 12, 1922.
7 SHEETS—SHEET 3.
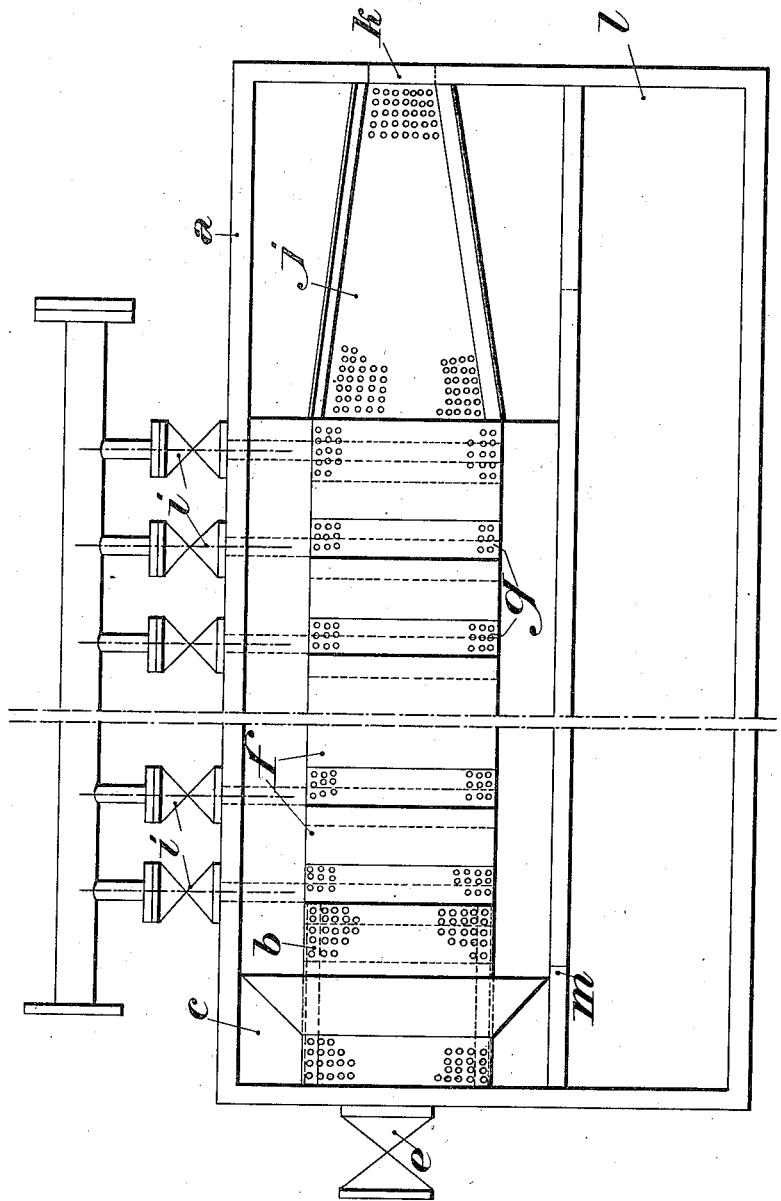

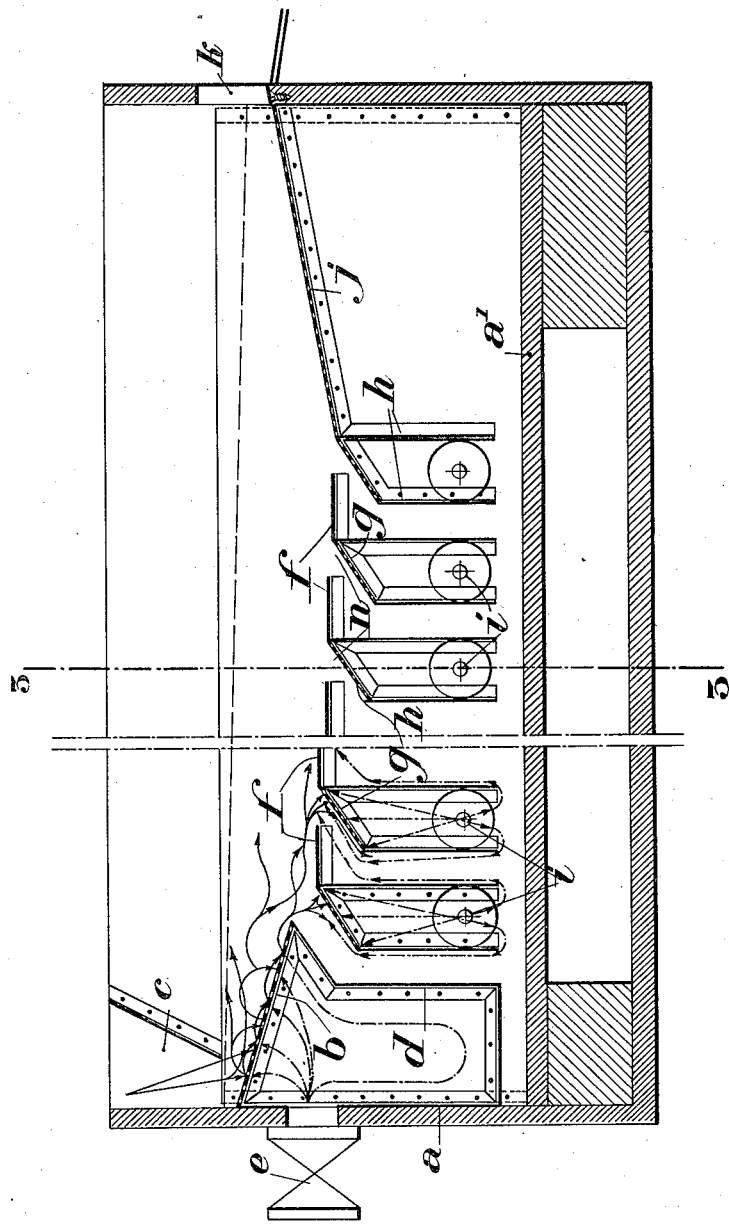

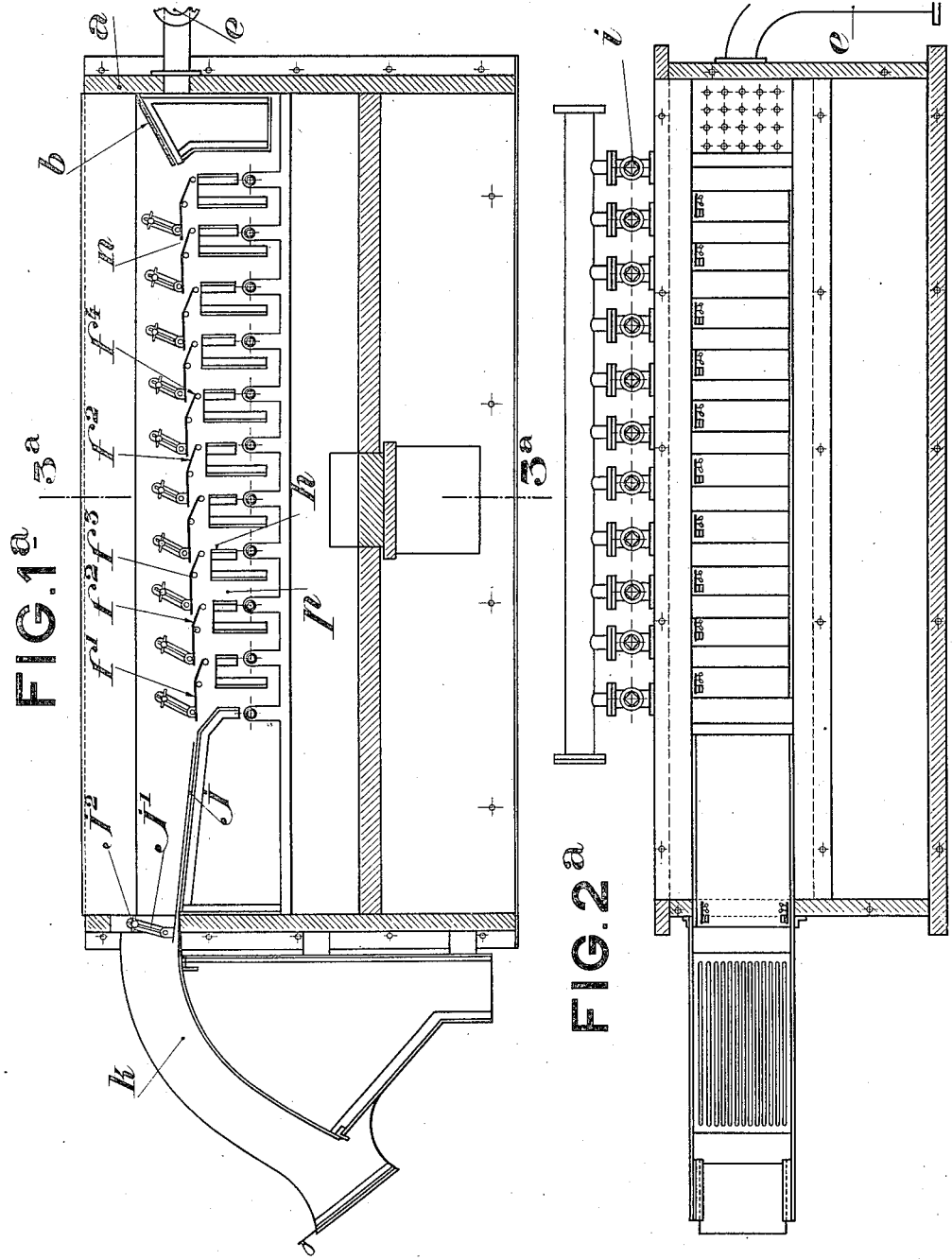
F. LIOUD.
APPARATUS FOR THE SEPARATION OF COKE OR CARBON FROM SLAG OR THE LIKE.
APPLICATION FILED JUNE 30, 1920.
1,438,537.
Patented Dec. 12, 1922.
7 SHEETS—SHEET 2.

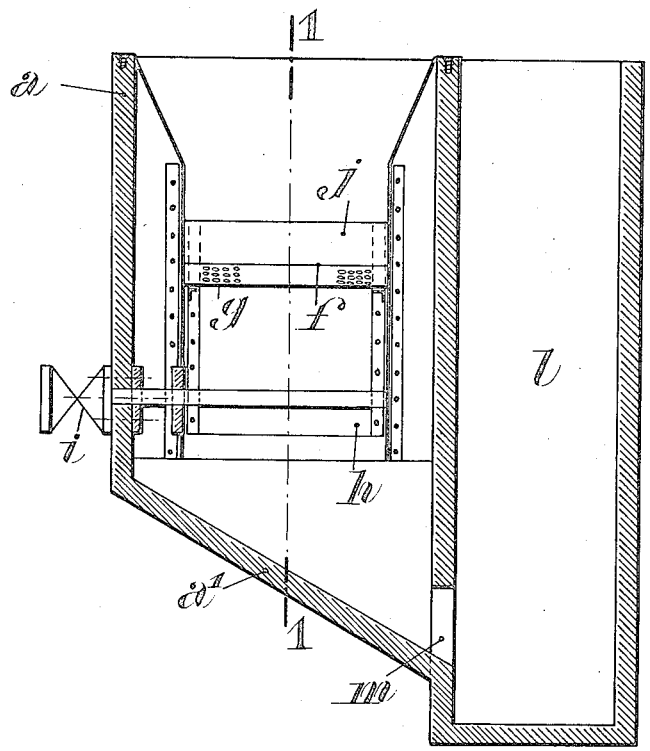

F. LIOUD.
APPARATUS FOR THE SEPARATION OF COKE OR CARBON FROM SLAG OR THE LIKE.
APPLICATION FILED JUNE 30, 1920.
1,438,537.
Patented Dec. 12, 1922.
7 SHEETS—SHEET 5.
FIG. 3ª
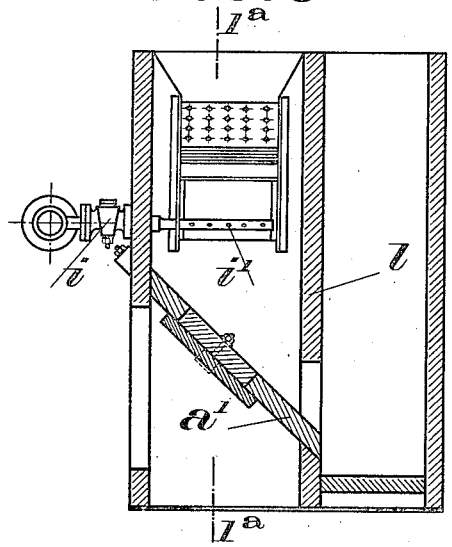
FIG. 7
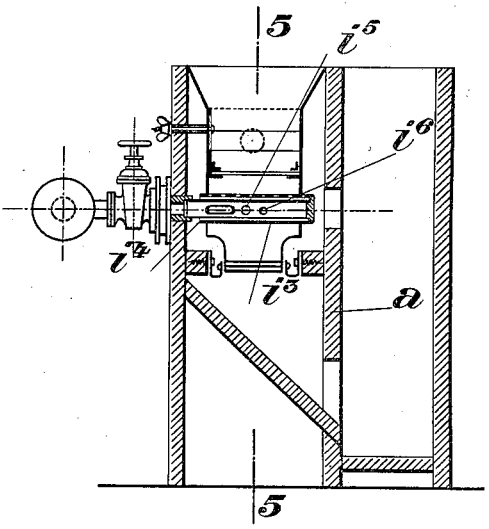
FIG. 4
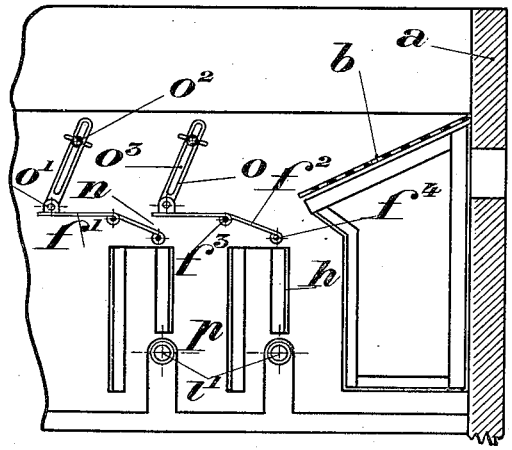
FIG. 8
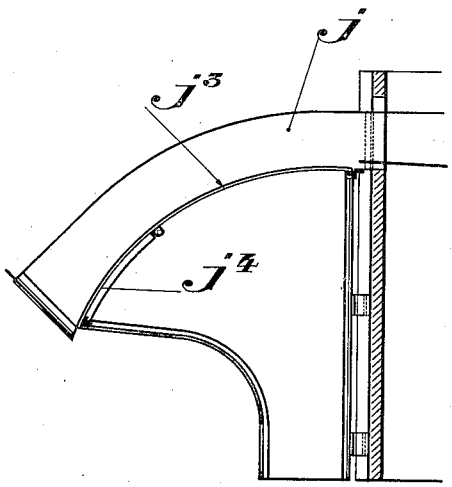

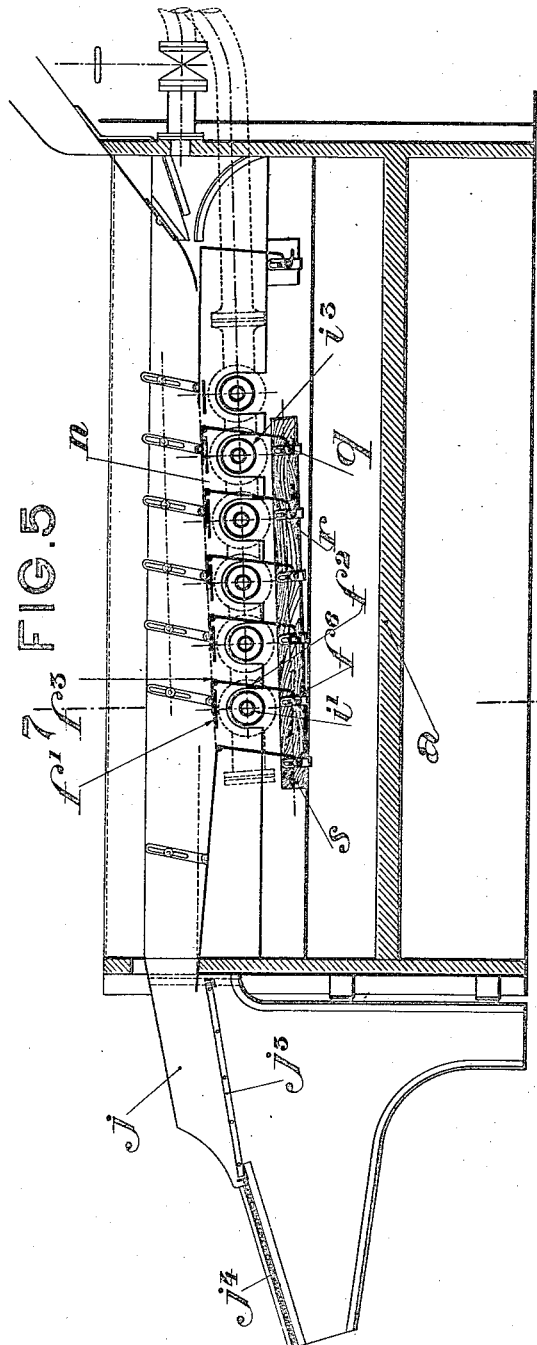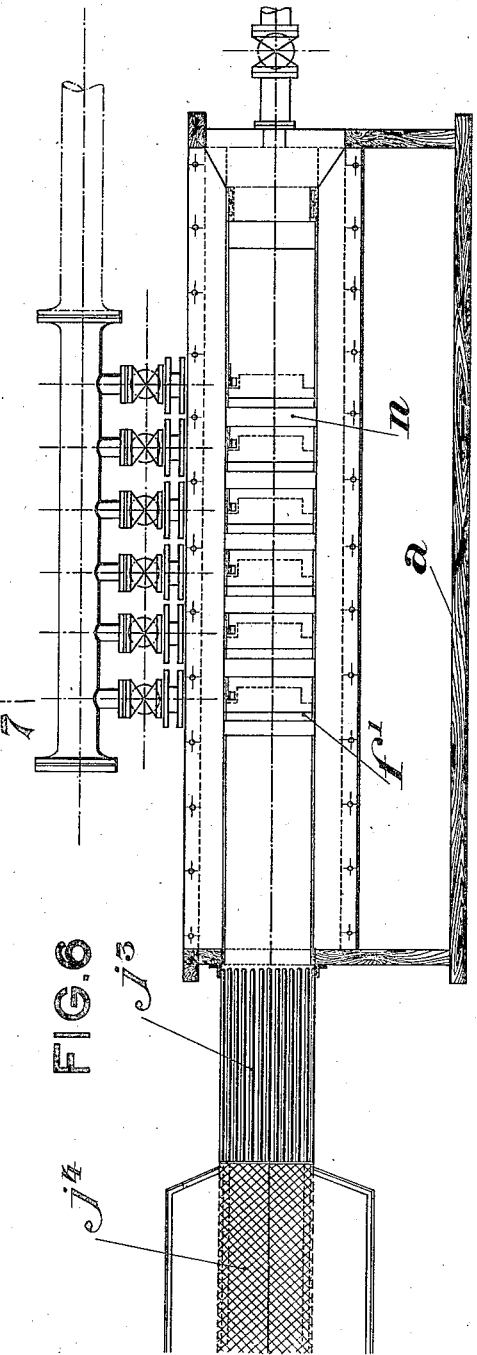

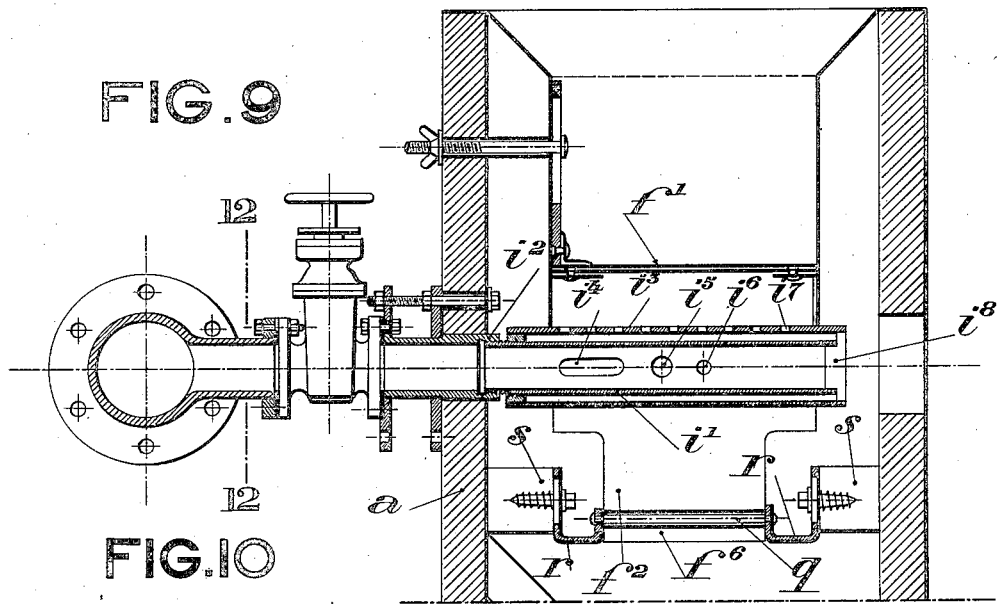

Patented Dec. 12, 1922.

1,438,537

UNITED STATES PATENT OFFICE.

FRANK LIOUD, OF ST. ETIENNE, FRANCE, ASSIGNOR TO SOCIÉTÉ LE COKE INDUSTRIEL, OF ST. ETIENNE, FRANCE, A CORPORATION OF FRANCE.

APPARATUS FOR THE SEPARATION OF COKE OR CARBON FROM SLAG OR THE LIKE.

Application filed June 30, 1920. Serial No. 393,155.

*To all whom it may concern:*

Be it known that I, FRANK LIOUD, a citizen of the French Republic, residing at St. Etienne, Loire, France, have invented certain new and useful Improvements in Apparatus for the Separation of Coke or Carbon from Slag or the like (for which I have filed applications in France, November 23, 1917, August 13, 1919, and January 7, 1920; in Italy, December 13, 1917; in Switzerland, October 7, 1918; Spain, October 25, 1918; Great Britain, November 23, 1918; Sweden, January 15, 1919; Denmark, January 15, 1919; Belgium, January 25, 1919; Luxemburg, February 9, 1919, and March 11, 1920; Austria, February 14, 1919; Germany, February 19, 1919; Norway, February 17, 1919; Japan, March 6, 1919; Hungary, March 24, 1919; South Africa, June 26, 1919; Argentina, July 12, 1919; Chile, August 9, 1919; Canada, November 12, 1919; and Holland, March 31, 1920), of which the following is a specification.

This invention relates to improvements in apparatus for the separation of coke or carbon from slag or the like.

The apparatus is intended for the recuperation of the utilizable fuel, coke or coal, contained in the waste of metallurgic establishments and of which the proportion varies from 5 to 30% according to the quality of the coal employed and the nature of the furnaces or grates used.

Apparatus for washing coal and other minerals are known in which the materials to be treated are fed by a horizontal stream of water along a trough over a number of passages opening into the bottom of the trough through which passages, ascending streams of water flow, the heavier materials falling down said ascending stream into a receiver from which they are discharged, and the lighter materials adhering to or falling with the heavy materials being washed back by the ascending streams into the trough and carried by the horizontal stream along said trough to be eventually evacuated therefrom.

The improved apparatus according to this invention works on a similar principle and comprises a trough, at one end of which is a compartment, the top of which is formed by an inclined perforated plate, and water is fed under pressure into said compartment and flows out through said plate and conveys the matters to be classified, which are fed onto said plate along curved paths in the horizontal stream flowing through the trough said curved paths varying with the densities of the matters. In front of the perforated plate are horizontal solid plates arranged at a gradually descending levels, and between these plates are spaces through which the upward currents flow, the water supplying these currents being fed into compartments fitted with valves for regulating the pressure of the water.

In classifying apparatus for separating minerals from alluvial wash comprising a trunk having transverse slits beneath which are the separating compartments, it is known to feed the material onto a perforated plate, through which water is fed, but in such apparatus the heavier matters fed onto said plate fall through the same into a receptacle below, which is not the case in the apparatus which makes the object of the present invention.

In the annexed drawings:

Figs. 1 to 3 illustrate the simplest form of construction of the apparatus.

Fig. 1 is a longitudinal section on the line 1—1 of Fig. 3.

Fig. 2 is a plan view of the apparatus.

Fig. 3 is a cross section on the line 3—3 of Fig. 1.

Figs. 1ª to 3ª illustrate a modification of the apparatus having for its purpose of obtaining a simple, precise and convenient regulation of the rising currents, allowing of arriving without loss of time at the most suitable working, in accordance with the nature, the coarseness and the composition of the products to be classified.

Fig. 1ª is a longitudinal section on line 1ª—1ª of Fig. 3ª.

Fig. 2ª is a plan view thereof.

Fig. 3ª is a transverse section on line 3ª—3ª of Fig. 1ª.

Fig. 4 is a detail view of the adjustable partitions constituting the regulating means.

Figs. 5 to 14 show another modification for the purpose of furnishing over the entire zone of classification an equal pressure per unit of surface, producing perfect classification of the useful products.

Fig. 5 is a vertical section on line 5—5 of Fig. 7.

Fig. 6 is a plan view of the same.

Fig. 7 is a transverse section on line 7—7 of Fig. 5.

Fig. 8 is a detail view of a form of grating particularly applicable in the case where the recuperated products are collected on a conveyor.

Fig. 9 is a detail view on a larger scale in section on line 9—9 of Fig. 10 of partitions and tubes.

Fig. 10 is a partial plan view.

Fig. 11 is a vertical section on line 11—11 of Fig. 10.

Fig. 12 is a section on line 12—12 of Fig. 9.

Fig. 13 is a plan view of a double water supplying tube.

Fig. 14 is a transverse section on line 14—14 of Fig. 13 drawn to a larger scale.

The apparatus illustrated Figs. 1 to 3 comprises a rectangular trough $a$ having a base $a^1$ laterally inclined as seen in Fig. 3. At one end of this trough is placed transversely and with a certain incline a perforated metal sheet $b$ on which the substances to be classified are fed from the hopper $c$, the ashes having been previously eliminated from said substances.

The metal sheet $b$ forms the lid of a compartment closed by plates $d$, into which water regulated by a valve-cock $e$ is introduced.

After the metal sheet $b$ are arranged horizontal solid plates $f$ of sheet-iron, separated by spaces $n$. These plates are placed at gradually descending levels, and their purpose is to guide the current of water which issues from the openings of the plate $b$ in a substantially horizontal direction.

In front of each of the iron-plates $f$ and below the spaces $n$ are disposed solid or perforated plates $g$ obliquely arranged. Towards the ends of these plates are solid vertical metal sheets $h$ forming compartments into which water is introduced and regulated in each by a valve-cock $i$. After the last compartment thus formed, a plate $j$ is arranged, which is perforated or not and is inclined upwardly, and at the end of which is an outlet $k$. Finally against the trough $a$ is installed a cistern $l$ communicating with the base of the trough through an opening $m$ provided in the common partition-wall.

In the apparatus, the water issuing with a certain pressure through the openings of the iron plate $b$ conveys the matter falling from the hopper along curved paths, varying with the density of the particles. The shape of the curved paths is approximately represented by the arrows shown in continuous lines in Fig. 1, whilst the direction of the water currents is represented by arrows drawn in dotted lines. The matters flow towards the outlet of the apparatus, whilst encountering the rising currents passing through the plates $g$; the heavy matters, less affected by said currents, fall to the bottom of the trough and pass into the cistern $l$, whereas the lighter matters are carried away by the current and pass through the outlet $k$. A bucket elevator or similar device removes the residue from the cistern as it accumulates.

In the form of construction of the apparatus shown in Figs. 1$^a$ to 3$^a$ and 4 the plates $f$ are movable and are divided into two parts $f^1$, $f^2$. These plates are doubly hinged as at $f^3$, $f^4$, the hinge $f^3$ being between the two plates $f^1$ and $f^2$, and the hinge $f^4$ at the end of the plate $f^2$.

Variable inclination can be given to these plates by means of slide levers $o$ connected to the plates $f^1$ by joints $o^1$ and of which the positions and inclinations are determined by winged nuts $o^3$ secured to the wall of the casing $a$ and passing through the slides $o^3$ of the levers $o$.

This arrangement renders absolutely independent the adjustment of the successive series of plates and, consequently, of the consecutive openings $n$. It further allows, by varying the inclination of the plates $f^1$, $f^2$ in relation to each other, of promoting a greater or less resistance to the sliding of the materials to be classed, which enables the apparatus to be readily adjusted for the treatment, under the best conditions, of products of different composition, bulk and density.

In like manner, the plate $j$ which ends at the overflow $k$ of the recuperated products, which formerly was fixed, is now movable and its inclination is adjustable by means of a slide lever $j^1$ which is kept in place, in the desired position, by means of a winged nut $j^2$ secured to the wall of the overflow. Thus the flow of the horizontal liquid stream can be regularized and its action extended.

The different double jointed plates $f^1$, $f^2$ are distributed so as to form a series of chambers or cells $p$ confined by the vertical plates $h$ (twelve in the example illustrated in the drawing, but this number can be increased or reduced) with adjustable inlets $n$ arranged at gradually decreasing levels from the entrance to the outlet of the apparatus. Each chamber is provided with a water inlet $j^1$ regulatable by a cock $i$, the current being directed from the bottom upwards.

Above the plates $f^1$, $f^2$ a horizontal stream of water constantly flows, supplied through the cock $r$ which receives, in the first place, the materials to be treated poured through a hopper onto the inclined plate $b$.

Under the action of this stream, the specially light substances are first driven to the surface and carried to the end of the plate $j$, whence a strainer $k$ conveys them into a trolley. The other materials arriving above the openings $n$, of which the size are adjustable at will, are automatically distributed in order of bulk in the chambers $p$. Under the combined action of the horizontal and ascending streams of water supplied through the cocks $e$ and $i$, and owing to the adjustment of the openings $n$ by the inclination of the plates $f^1$, $f^2$, classification by density is effected; the heavier sterile substances fall to the bottom of the tank and the incompletely carbonized coke and coals are recaptured by the horizontal current and collected, like the very light ones, on the plate $j$, whilst the sterile substances sliding on the inclined bottom $a^1$ of the tank are evacuated outside by a conveyor comprising perforated buckets mounted in the compartment $l$.

The fact of rendering adjustable the plates $f^1$, $f^2$ and consequently the section of the orifices $n$ makes it possible to omit the previous outside sifting and to automatically submit each category of scoria treated to the treatment best suited to its nature, with a view to the recuperation of the products hitherto lost.

The form of construction shown in Figs. 5 to 14 has the following further features:—

1. The partitions $f^1$, $f^2$ are movable in all directions by means of a joint $f^3$ and slides $f^5$. This movement in all directions enables the orifices through which issue the ascending currents to be adjusted at will. Moreover, these partitions, made of sheet iron, which are simply hooked by their bent lower part $f^6$ on adjustable round iron cross bars $q$ fastened to supports $r$ screwed on longitudinal bars $s$ of the trough $a$ are very easy to mount and dismount.

2. The supply pipes for the ascending currents of water are modified so as to fulfil the three following conditions:—to operate as close as possible to the sorting openings; to act at will on the whole or part of the surface of said openings, which are adjustable; and to give the necessary pressure for the classification with complete regularity on the whole surface of the openings.

This threefold result is obtained in the following manner:

The inlet pipes are placed under the partitions $f^1$ plumb with the orifices. They are simply screwed by their tapped end inside the sockets $i^2$, and they are enclosed by perforated concentric jackets $i^3$ by means of which a very even pressure is obtained along the whole length of the pipe. For this purpose the inside tube $i^1$ is provided with three unequal sized holes $i^4$ $i^5$, $i^6$ for the entrance of water into the intermediate chamber between it and the outside tube $i^3$. The latter is provided with a certain number of small equal sized holes $i^7$ for the issue of the water. These two tubes are mounted concentrically and kept in place by two washers $i^8$, $i^8$.

3. The coke outlet $j$ is provided with a grating $j^3$ intended for filtering the wash and with a perforated sheet-iron $j^4$ for a further sorting by hand of the recuperated products (Figs. 5 and 6). When the latter are to be collected on a feed-sorter the grating and perforated iron plate are given a curved shape, as shown in Fig. 8.

The number of the classification openings $n$ is variable, according to the size of the apparatus; in practice it has been found that six openings are sufficient in the majority of cases.

What I claim and desire to secure by Letters Patent of the United States is:

1. Separating apparatus of the class described embodying a series of upwardly discharging ducts open at the lower end and arranged one in rear of another, substantially horizontally arranged plates over said ducts, arranged in spaced relation one behind another, means to feed material onto the first of the series of plates, means to receive discharged material from the rearmost of said plates, means to receive material which drops through said ducts and means to force water upwardly through said ducts and over said plates and comprising an intake pipe closed at the outer end and having radial openings of various sizes, decreasing in size toward the outer end of said pipe, and a discharge pipe of greater diameter than and around the intake pipe, and having openings in its upper side.

2. Separating apparatus of the class described embodying a series of upwardly discharging ducts open at the lower end and arranged one in rear of another, substantially horizontally arranged plates over said ducts, arranged in spaced relation one behind another, means to feed material onto the first of the series of plates, means to receive discharged material from the rearmost of said plates, means to receive material which drops through said ducts and means to force water upwardly through said ducts and over said plates, said plates being mounted for vertical angular adjustment and each comprising a pair of members flexibly connected together, and means connected to one of said members to adjust said members to any desired inclination.

In witness whereof I affix my signature.

FRANK LIOUD.

Witness:
GUILLAUME PIOCHE.